United States Patent [19]

Schindel et al.

[11] 4,371,803

[45] Feb. 1, 1983

[54] COMMUTATOR BRUSH HOLDER QUADRATURE SPRING

[75] Inventors: Arnold Schindel, Fairlawn; John A. Caspar, Verona, both of N.J.

[73] Assignee: The Singer Company, Little Falls, N.J.

[21] Appl. No.: 191,896

[22] Filed: Sep. 29, 1980

[51] Int. Cl.[3] .......... H02K 13/10

[52] U.S. Cl. .......... 310/242; 310/239; 310/246; 339/5 R

[58] Field of Search .......... 310/68 D, 239, 242, 310/244, 246, 245, 248; 339/5 R, 5 A, 5 L, 5 M, 5 P, 5 RL, 5 S, 6 R, 6 A, 6 RL, 8 R, 8 A, 8 L, 8 P, 8 PB, 8 PS, 8 RL

[56] References Cited

U.S. PATENT DOCUMENTS

| | | | |
|---|---|---|---|
| 2,104,721 | 1/1938 | Berger | 310/246 |
| 3,158,773 | 11/1964 | Diehl | 310/246 |
| 3,537,058 | 10/1970 | Ferraz | 339/5 R |
| 3,742,272 | 6/1973 | Shattuck et al. | 310/239 |
| 3,983,432 | 9/1976 | Rankin | 310/242 |

FOREIGN PATENT DOCUMENTS

| | | | |
|---|---|---|---|
| 586176 | 10/1933 | Fed. Rep. of Germany | 171/324 |
| 2460959 | 12/1974 | Fed. Rep. of Germany | 310/239 |
| 995630 | 12/1951 | France | 310/246 |

*Primary Examiner*—J. D. Miller
*Assistant Examiner*—D. Rebsch
*Attorney, Agent, or Firm*—Morris Liss; T. W. Kennedy

[57] ABSTRACT

A commutator brush holder mounts a pair of tension band springs in quadrature relation. Both springs contact the brush end remote from the commutator and urge the brush into contact with the commutator, with constant force. The quadrature springs promote full and intimate contact between the brush and commutator, thereby minimizing brush bounce and tilt and resultant transient signal generation.

7 Claims, 4 Drawing Figures

COMMUTATOR BRUSH HOLDER QUADRATURE SPRING

FIELD OF THE INVENTION

The present invention is directed to commutator brush holders and more particularly to such a holder having quadrature springs mounted therein for minimizing brush bounce and tilt.

BRIEF DESCRIPTION OF THE PRIOR ART

Heretofore commutator or other electrical brushes have employed various mounting means wherein there has been exerted on the brush, tension or pressure from an ordinary helical, spiral, leaf or motor type spring. The effectiveness of the brushes, and the life thereof, is naturally lessened when the brushes are subjected to arcing. This arcing has been inherently present in prior brush constructions due to the tendency of the brush to "bounce"or move away from the commutator upon hitting an irregularity or rough spot thereon. As heretofore mounted and with the springs heretofore used, a rapidly revolving commutator may have had a tendency to set up a bouncing action which may be likened to a harmonic, and which may in fact have resulted from the harmonic or periodicity of the brush spring.

Aside from extending the life of the brush itself, where high speed motors are used in the vicinity of data or control circuitry, brushes tend to tilt at the brush-commutator interface which causes the transmission of undesirable transient signals.

The prior art has recognized the usefulness of a band type tension spring having prestressed metal coiling at opposite ends and producing a beam length in between. This type of spring is disclosed in U.S. Pat. Nos. 2,683,829 to Gerber and 2,695,968 to Welch et al.

Although the spring structure as disclosed in these references may function satisfactorily for minimizing "bounce" in relatively low speed brush motors, the use of a single spring in a brush holder does not eliminate brush "bounce" and tilt in high speed brush motors. It now appears that this disadvantageous phenomenon is related to a number of factors, including commutation, inertial functional effects, and the characteristics of this type of spring as well as brush holder geometry. Although the brush holder springs disclosed in the prior art references may be used to retain brush pressure without accelerating brush wear, thereby extending the life of the brushes, an improvement is required in order that such a spring be employed in high speed brush motors. The single spring is particularly sensitive to the effects of brush "bounce" because such a spring has no characteristic spring rate, only a hysteresis effect to stabilize displacement.

BRIEF DESCRIPTION OF THE PRESENT INVENTION

The present invention is an improvement over the prior art as exemplified in the previously mentioned U.S. patents. The invention resides in the introduction of quadrature tension band springs into a single brush holder to encourage full and intimate contact between the brush and the commutator. By virtue of the present invention, the respective planes of the spring center lines are parallel and perpendicular to and through the armature center line. The increased surface contact achieved with such an assembly is due to the stiffness of the uncoiled spring sections in twisting, in response to forces in the plane perpendicular to the axis of rotation.

Further, the brush holder of the present invention recognizes that it is beneficial that the vector tangent to the commutator outer diameter, at the point where the leading edge of a commutator bar contacts the facing brush edge, intercepts the brush block at its lower extremity to achieve balance. Lack of reaction at this point, or reaction at a point further removed from the commutator will promote brush tipping and resultant transient generation.

The above-mentioned objects and advantages of the present invention will be more clearly understood when considered in conjunction with the accompanying drawings, in which:

DETAILED DESCRIPTION OF THE INVENTION

Figure 1:
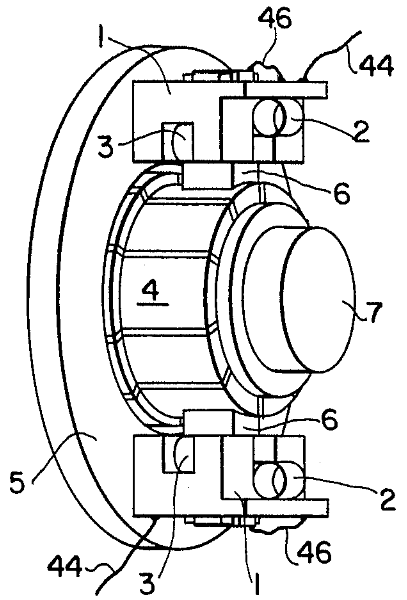
FIG. 1 is a perspective view of the disclosed quadrature springs, mounted in respective brush blocks and illustrates contact between brushes and a commutator.
Figure 2:
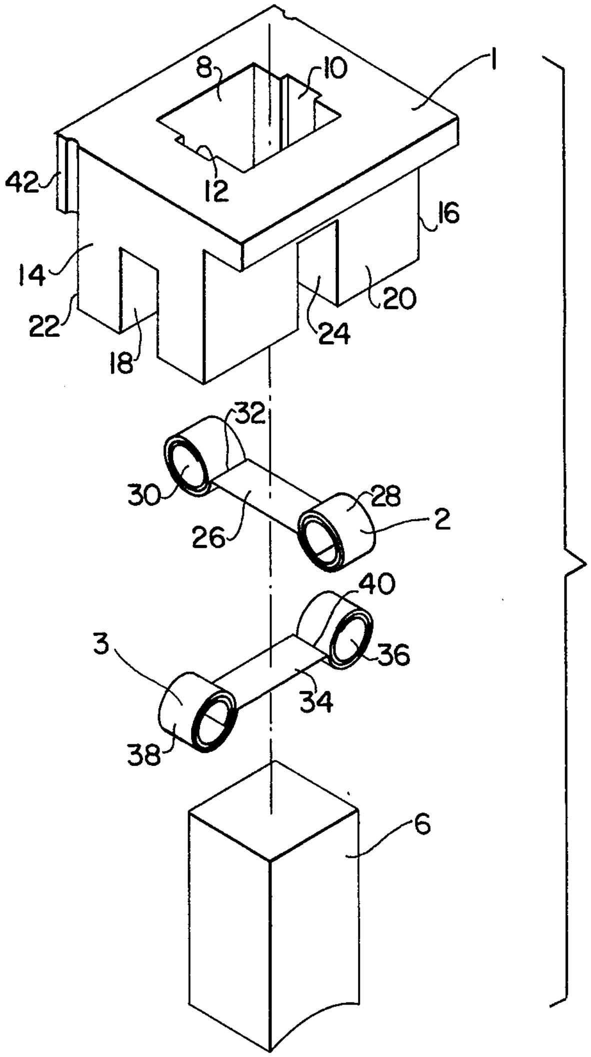
FIG. 2 is a disassembled view of the quadrature springs shown relative to the brush block and brush.

Referring to the figures and more particularly FIG. 1 thereof, a brush holder plate 5 is illustrated. Such a plate is customarily secured to a motor housing (not shown) and is adjustable with respect to a fixed magnetic field for minimizing ripple or to balance back EMF for bidirectional performance equality. Two diametrically opposed metallic brush holders 1 are illustrated as secured to the plate 5. The holders are mechanically fastened or molded into the brush holder plate 5, the latter customarily made of an insulating plastic material. Two holders are illustrated for a two-pole motor. It is understood that additional poles may require additional holders. Tension band springs 2 and 3, shown in greater detail in FIG. 2, are positioned within holders 1 and urge brush 6, also positioned in holders 1 into contact with armature commutator 4. The brush holders are symmetrical with respect to the axially located armature shaft 7.

FIG. 2 illustrates the specific construction of springs 2, 3 and a block-like brush holder 1. A rectangular slot 8 is centrally and axially formed through the holder, the slot having oppositely confronting vertical guideways 10 and 12, which guide the unrolled length of spring 3 when brush 6 and the springs 2, 3 are positioned within the holder 1. The side edges 14 and 16 of each holder 1 have a rectangular recess 18 formed therethrough to accomodate the beam section 34 of spring 3. The outward rolled ends 36 and 38 are contained within the recess 18 and contact respectively confronting edges of brush 6. A second recess 24 is formed through the front face 20 and back face 22 of each holder 1 and receives the rolled end 28 and 30 of spring 2 while the beam section 26 and 34 thereof flatly contact respective contacting surfaces of brush 6. Spring 2 has folds 32 formed between the beam section 26 and rolled ends 28, 30 so that right angles are formed at the top portion of the brush to more fully ensure engagement between the spring and the brush. Similarly, fold 40 is formed between the beam section 34 and the rolled ends 36, 38 of spring 3. The flat engagement between the top of the brush and the beam sections of springs 2 and 3 is more clearly shown in FIG. 1. A shoulder 42 appends outwardly from the rear back face 22 to facilitate molding of the holders 1 into a plastic brush holder plate 5.

Lead 44 provides a point of electrical connection to brush 6. A jumper lead 46 short circuits a brush 6 to its corresponding holder 1 to minimize transient generation.

It will be understood that an entire motor structure has not been illustrated so that greater clarity of the present invention can be rendered.

Figure 3:
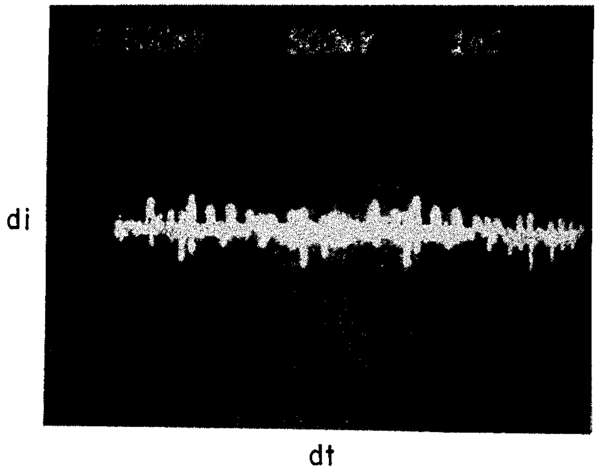
FIG. 3 is a plot showing improved current transient performance by utilizing the present invention.
Figure 4:
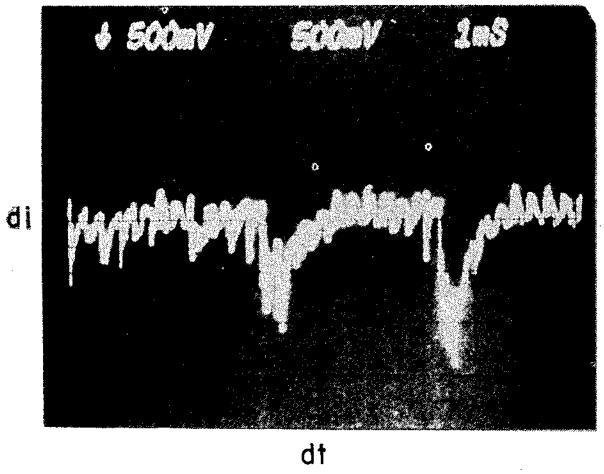
FIG. 4 is a plot illustrating current transient performance occurring as a result of utilizing only a single tension spring per brush block. (Spring center line plane perpendicular to armature center line)

With the prior art, single band spring per holder, frictional effects and moments at the commutator slot leading edge interface (between commutator bars and brush edge) cause brush tipping due to reactions involved. This upsets brush contact. The resultant transient effects in brush current is shown in FIG. 4. FIG. 3 shows a plot of brush current with the utilization of the present invention. The absence of transients will be noted.

It should be understood that the invention is not limited to the exact details of construction shown and described herein for obvious modifications will occur to persons skilled in the art.

We Claim:

1. A motor commutator brush holder assembly comprising:

means for retaining a single brush therein;

at least first and second biasing means mounted in the brush retaining means and disposed in right angled overlying relation to each other, the biasing means contacting a brush end opposite the end adapted for contacting a commutator, thereby urging the brush into full contact with the commutator during motor operation.

2. The assembly of claim 1 wherein the biasing means comprises:

first and second tension band springs, each having oppositely disposed coiled ends separated by a central beam section.

3. The assembly of claim 1 wherein the brush retaining means includes recesses formed therein for receiving the mounted springs.

4. The assembly of claim 2 wherein a fold is formed at each end of the central beam section for enabling the central beam section of each spring to flatly bear against a brush end, opposite a commutator confronting end.

5. The assembly set forth in claim 2 wherein the brush retaining means includes recesses formed therein for receiving the mounted springs.

6. The subject matter set forth in claim 5 wherein a fold is formed at each end of the spring beam section for enabling the central beam section of each spring to flatly bear against a brush end, opposite a commutator confronting end.

7. A brush holder for a motor commutator comprising:

a motor brush;

a metallic block having a slot formed therein for receiving the brush;

first and second tension band springs, each spring having oppositely disposed coiled ends separated by a Cental beam section, the springs positioned in recesses formed in the block in right angled overlying relation;

folds formed in each spring between the junctures of the beam section and the coiled ends, the folds enabling the central beam sections of the springs to flatly bear against an end of the brush opposite an end adapted for contacting a commutator, the springs enabling full contact with a commutator during motor operation.

* * * * *